UNITED STATES PATENT OFFICE 2,509,245

PREPARATION OF 2,4,5-TRICHLOROPHENOL

Edward Joseph Nikawitz, Passaic, and William S. Gump, Upper Montclair, N. J., assignors to The Givaudan Corporation, a corporation of New Jersey No Drawing. Application March 20, 1947, Serial No. 736,118

5 Claims. (Cl. 260—623)

This invention relates to a process for preparing 2,4,5-trichloro phenol, and more especially to a process wherein 1,2,4,5-tetrachloro benzene is subjected to alkaline hydrolysis in the presence of ethylene- or propylene glycol (propanediol-1,2).

2,4,5-trichloro phenol has been prepared from 1,2,4,5-tetrachloro benzene by hydrolyzing the latter with alkali in the presence of methyl alcohol, the process being conducted under considerable pressure, of the order of 600–800 pounds per square inch. Special pressure equipment is required for conducting such a process. Moreover, appreciable amounts of the methyl ether of 2,4,5-trichloro phenol form when methyl alcohol is employed; and the formation of the ether is undesirable as it decreases the yield of the desired free phenol.

Our present invention overcomes the foregoing disadvantages and provides a process for making 2,4,5-trichloro phenol from 1,2 4,5-tetrachloro benzene which can be conducted with cheaper and simpler equipment than is required by the prior art process, and which does not result in the formation of any appreciable amount of ether.

In general, our process may be conducted by dissolving an alkali metal hydroxide, such as sodium hydroxide, potassium hydroxide and lithium hydroxide, in ethylene glycol or propylene glycol, or a mixture thereof, at elevated temperatures while stirring the contents. The tetrachloro benzene is then added and the mixture is heated for a few hours, normally 3–4 hours being sufficient. The end point of the reaction can be determined easily by taking a sample of the reaction mixture and diluting it with water. If the sample is water soluble or practically entirely soluble in the water, the reaction may be considered to have been completed. The desired phenol may be isolated in accordance with known procedures. For example, the reaction mixture may be cooled after the test as above shows substantial completion of the reaction, and then acidified with a mineral acid such as hydrochloric acid. The precipitated alkali metal chloride is filtered off. The filtrate is poured into water, causing the 2,4,5-trichloro phenol to precipitate. The phenol is extracted with benzene and the benzene extract is distilled to remove the benzene and yield the phenol. The aqueous layer remaining after the benzene extraction is fractionally distilled to remove the glycol employed.

The proportions of the ingredients used may be varied. The alkali metal hydroxide is used in amounts equivalent to at least 2 mols of hydroxide per mol of tetrachloro benzene. 2–3 mols of hydroxide per mol of tetrachloro benzene gives excellent results. Higher amounts of hydroxide may be employed, but are unnecessary.

With regard to the amount of glycol which should be employed in our process, we find that excellent results are obtained when about 750 grams of the glycol per 216 grams (1 mol) of the tetrachloro benzene are used. Larger amounts of glycol may be used, but in such cases no advantageous results follow. Amounts less than 450 grams of glycol per 216 grams of tetrachloro benzene are not recommended, as yield and quality of the desired phenol are adversely affected.

The temperature range at which the hydrolysis may be effected is between about 160° C. and 200° C., the preferred range being between about 170° C. and 180° C. Higher temperatures are obtainable when propylene glycol is employed than is the case when ethylene glycol is employed.

A special advantage of this process is that it can be conducted at atmospheric pressure, under reflux. However, if desired, the contents may be heated in a closed system, whereby a slight pressure is built up, amounting however to not more than 15 to 20 pounds per square inch, and not necessitating the use of any special pressure equipment in the plant.

The invention is illustrated by the following examples without however limiting the same to them.

Example I 60 grams of sodium hydroxide flakes (95% NaOH) were dissolved in 500 grams of ethylene glycol in a 2 liter three-necked flask provided with stirrer and an air condenser. The contents were heated to 150° C.–160° C., this step requiring about 30 minutes. 144 grams of 1,2,4 5-tetrachloro benzene were rapidly added to the solution, and the mixture was heated to 170° C.–180° C. (inside temperature), and maintained at that temperature range for 4 hours. 10 grams of tetrachloro benzene sublimed in the air condenser and were recovered. A sample of the reaction mixture gave a clear solution when dissolved in 10 times its weight of water.

The reaction mixture was allowed to cool; dry hydrogen chloride was passed into it until it became acid to litmus. The slight excess of hydrogen chloride was neutralized by the addition of a small amount of sodium bicarbonate. After cooling again to about 20° C., the salt was filtered by suction and the salt cake was washed with 50 cc. of isopropyl alcohol. 600 cc. of water were added to the filtrate resulting in a bottom layer of precipitated trichloro phenol and a top layer of dilute ethylene glycol. The entire mixture was extracted with 400 cc. of benzene, then with 100 cc. of benzene and finally with 80 cc. of benzene.

The combined benzene extracts were shaken with 200 cc. of water and the water layer was separated and added to the dilute ethylene glycol. The washed combined benzene extracts were dried by means of anhydrous sodium sulfate, filtered, and distilled. After removal of the benzene, the residue was distilled at a pressure of 4 mm. of mercury. 106 grams of 2,4,5-trichloro phenol, boiling at 101° C.–105° C., and having a congealing point of 63.3° C. (uncorrected), were obtained.

The ethylene glycol can be recovered by distillation of the aforementioned dilute ethylene glycol. The water and isopropyl alcohol were removed in a fractionating still at a pressure of 90 mm. of mercury, the temperature being carried up to 50° C. The ethylene glycol was then distilled under high vacuum (3 mm.), 232 grams of the glycol boiling at 80° C. being recovered. In order to remove practically all of the ethylene glycol from the small amount of salt remaining in the distilling flask, the temperature was raised so that some glycol, boiling from 80° C. to 120° C., was obtained.

*Example II*

72 grams of 1,2,4,5-tetrachloro benzene were stirred and heated to 190–200° C. with a solution of 30 grams of sodium hydroxide in 250 grams of propylene glycol, the heat treatment being conducted for 6 hours. 24 grams of concentrated sulfuric acid (93% $H_2SO_4$) were added to the reaction contents after they were cooled to room temperature (about 25° C.). The entire contents were poured into 1000 cc. of water. The solid material was then filtered and washed with 500 cc. of water and finally dissolved in 200 cc. of benzene. The benzene solution was dried with anhydrous sodium sulfate and then filtered.

After removal of the benzene by distillation, the residue was distilled under a high vacuum (5 mm.), 45 grams of 2,4,5-trichloro phenol being obtained thereby.

The foregoing illustrates the practice of this invention, which however, is not to be limited thereby but is to be construed as broadly as permissible in view of the prior art and limited solely by the appended claims.

We claim:

1. The process for preparing 2,4,5-trichlorophenol, which comprises heating at 160°–200° C. in the following proportions: 1 gram molecular weight of 1,2,4,5-tetrachloro benzene and at least 2 gram molecular weights of an alkali metal hydroxide in the presence of at least 450 grams of at least one material from the group consisting of ethylene glycol and propylene glycol, the reaction being conducted under a pressure within the range of that of the atmosphere up to 20 pounds per square inch and for a time sufficient to substantially complete the conversion into 2,4,5-trichlorophenol.

2. The process for preparing 2,4,5-trichlorophenol, which comprises heating at 160°–200° C. in the following proportions: 1 gram molecular weight of 1,2,4,5-tetrachloro benzene and at least 2 gram molecular weights of an alkali metal hydroxide in the presence of at least 450 grams of ethylene glycol, the reaction being conducted under a pressure within the range of that of the atmosphere up to 20 pounds per square inch and for a time sufficient to substantially complete the conversion into 2,4,5-trichlorophenol.

3. The process for preparing 2,4,5-trichlorophenol, which comprises heating at 160°–200° C. in the following proportions: 1 gram molecular weight of 1,2,4,5-tetrachloro benzene and at least 2 gram molecular weights of sodium hydroxide in the presence of at least 450 grams of ethylene glycol, the reaction being conducted under a pressure within the range of that of the atmosphere up to 20 pounds per square inch and for a time sufficient to substantially complete the conversion into 2,4,5-trichlorophenol.

4. The process for preparing 2,4,5-trichlorophenol, which comprises heating at 170°–180° C. in the following proportions: 1 gram molecular weight of 1,2,4,5-tetrachloro benzene and 2–3 gram molecular weights of sodium hydroxide in the presence of 750 grams of ethylene glycol, the reaction being conducted under atmospheric pressure and for a time sufficient to substantially complete the conversion into 2,4,5-trichlorophenol.

5. The process for preparing 2,4,5-trichlorophenol, which comprises heating at 170°–180° C. in the following proportions: 1 gram molecular weight of 1,2,4,5-tetrachloro benzene and 2–3 gram molecular weights of sodium hydroxide in the presence of 750 grams of propylene glycol, the reaction being conducted under atmospheric pressure and for a time sufficient to substantially complete the conversion into 2,4,5-trichlorophenol.

EDWARD JOSEPH NIKAWITZ.
WILLIAM S. GUMP.

REFERENCES CITED

The following references are of record in the file of this patent:

FOREIGN PATENTS

| Number | Country | Date |
|---|---|---|
| 349,794 | Germany | July 29, 1914 |

OTHER REFERENCES

Harrison et al., "Polyhalogeno—Derivatives." J. Chem. Soc. (1943), pages 235–7 (3 pages, pages 235 and 236 are pertinent).

Spielmann, "Richter's Organic Chemistry," vol. I, published by P. Blakiston's Son & Co., Philadelphia (1921), pages 98, 99 (2 pages).